US012719846B2

(12) United States Patent
Madni et al.

(10) Patent No.: US 12,719,846 B2
(45) Date of Patent: Aug. 25, 2026

(54) SPARSE DOMAINS EXPLOITATION FOR PHYSICAL LAYER AUTHENTICATION

(71) Applicant: Vestel Elektronik Sanayi ve Ticaret A. S., Manisa (TR)

(72) Inventors: Haji Muhammad Furqan Ahmed Madni, Manisa (TR); Liza Afeef Omar Shehab El Din, Manisa (TR); Amira Bendaimi, Manisa (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 0 days.

(21) Appl. No.: 18/944,151

(22) Filed: Nov. 12, 2024

(65) Prior Publication Data

US 2025/0158972 A1 May 15, 2025

(30) Foreign Application Priority Data

Nov. 13, 2023 (EP) .................................... 23209427

(51) Int. Cl.
*H04L 9/40* (2022.01)

(52) U.S. Cl.
CPC .............. *H04L 63/08* (2013.01); *H04L 63/16* (2013.01)

(58) Field of Classification Search
CPC ....... H04L 63/08; H04L 63/16; H04L 9/0875; H04L 9/32; H04L 9/3263; H04L 63/0823; H04W 12/79; H04W 12/069; G06F 21/33; H06L 9/06
See application file for complete search history.

(56) References Cited

U.S. PATENT DOCUMENTS 11,877,153 B2 * 1/2024 Pang ................... H04W 12/065
12,563,013 B1 * 2/2026 Wu ......................... H04L 41/12
12,604,186 B2 * 4/2026 Balmakhtar .......... H04W 12/06
(Continued)

FOREIGN PATENT DOCUMENTS

CN 113055057 A 6/2021

OTHER PUBLICATIONS

Rabah Ouchikh et al. “Sparce Channel estimation algorithm for OTFS system,” 2022, pp. 2158-2170, (Year: 2022).*
(Continued)

*Primary Examiner* — Luu T Pham
*Assistant Examiner* — Canh Le
(74) *Attorney, Agent, or Firm* — The Webb Law Firm

(57) ABSTRACT

Techniques and methods are described to perform physical layer authentication, using a received signal transmitted from a communication device that has been already authenticated previously. To identify a potential attacker, a current value of a plurality of physical layer L1 parameters of the wireless channel is determined, with said L1 parameters describe for a sparse channel. A value of the plurality of L1 parameters that have been stored at the previous authentication are obtained from a storage. Based on the current value and the stored value of the plurality of L1 parameters, the communication device is authenticated. In this way, the physical layer authentication may provide for a robust and reliable authentication of communication devices in sparse communication channels, including static and dynamic wireless environments.

13 Claims, 4 Drawing Sheets

(56) References Cited

U.S. PATENT DOCUMENTS

2021/0368338 A1 11/2021 Lord et al.

OTHER PUBLICATIONS

Jie Tang et al. "Physical layer authentication for 5G/6G millimeter wave communications by using channel sparsity," pp. 206-217 (Year: 2022).*

Pinchang Zhang et al., "Utilizing Multi-Dimensional MmWave MIMO Channel Feature for Location Verification," 2022, pp. 1-17 (Year: 2022).*

Run-Fa Liao et al., "Deep-Learning-Based Physical Layer Authentication for Industrial Wireless Sensor Networks," 2019, pp. 1-17 (Year: 2019).*

Jie Tang et al., "MmWave MIMO Physical layer Authentication by Using Channel Sparsity," 2020, pp. 221-224 (Year: 2020).*

Songlin Chen et al., "Physical-Layer Channel Authentication for 5G via Machine Learning Algorithm," 2018, pp. 1-10 (Year: 2018).*

Andreas Weinand et al., "Multi-Feature Physical Layer Authentication for URLLC based on Linear Supervised Learning," 2023, pp. 30-35 (Year: 2023).*

Ning Xie et al., "A Survey of Physical-Layer Authentication in Wireless Communications," 2021, pp. 282-310 (Year: 2021).*

Liu et al., "Online machine learning-based physical layer authentication from MmWave MIMO systems", Ad Hoc Networks, 2022, vol. 131, pp. 1-13.

Tang et al. "Physical layer authentication for 5G/6G millimeter wave communications by using channel sparsity", IET Communications, 2022, vol. 16, pp. 206-217.

* cited by examiner

Communication System CS
Transmitter Tx
Interface ITF
Receiver Rx

Memory 251
Processing circuitry 252
Wireless transceiver 253
User interface 254
255
250

Memory 261
Processing circuitry 262
Wireless transceiver 263
User interface 264
265
260

SPARSE DOMAINS EXPLOITATION FOR PHYSICAL LAYER AUTHENTICATION

CROSS-REFERENCE TO RELATED APPLICATION

This application claims priority to European Patent Application No. 23209427.6, filed Nov. 13, 2023, the disclosure of which is hereby incorporated by reference in its entirety.

BACKGROUND

Field

The present disclosure relates generally to wireless communication, and in some embodiments to physical layer authentication (PLA).

Technical Considerations

The fifth generation (5G) and beyond communication systems face diverse demands for applications such as low latency, improved reliability, high data rates, and flexibility. However, the security of the transmitted data between legitimate nodes is still a major concern that needs to be addressed; this is due to the open and broadcast nature of wireless communication that makes it susceptible to various attacks, the latter aims to target different security services such as data confidentiality, message integrity, and node authentication. Thus, communication must be extremely secure and protected against those malicious threats.

Physical layer authentication (PLA) is an aspect of security; which aims to distinguish between authorized and unauthorized entities by using physical layer attributes of devices and environments. This is done by leveraging the inherent randomness in wireless communication channels and/or the unique features of hardware fabrication processes to harvest entropy and provide authentication. To this end, PLA techniques can be broadly classified into two categories: channel-based schemes and radio frequency (RF)-hardware-based.

However, the aforementioned schemes are limited to multipath environments and fail in sparse conditions. In sparse channel design, few works exist efficient PLA schemes which are directed to sparse static system design. In these works, features of multiple antenna channel representation in 5G communication networks are used for a better PLA design by exploiting its unique attributes, such as beam pattern and channel sparsity in the angle domain. However, these works are limited to the static sparse environment; their proposed methods are not resilient to channel variations, and cannot be applied in highly dynamic environments. So far, the authentication issue in the sparse dynamic radio environment has been efficiently tackled by employing Artificial Intelligence (AI) techniques such as effective machine learning-based (ML-based) spoofing attack detection. The model achieves classification only depending on training data. However, the presented model needs a sufficient amount of training data to address the dynamicity of the multiple antenna channel.

A unified authentication framework that is applied in sparse scattering environments in both static and dynamic scenarios without performance degradation is still an open issue to be solved. Furthermore, one of the main challenges in the current PLA schemes encapsulates authorizing multiple legitimate nodes simultaneously with different channel conditions to meet the system requirements of the next-generation networks.

SUMMARY

Methods and techniques are described herein for facilitating physical layer authentication. The present disclosure provides methods and techniques to perform physical layer authentication in sparse wireless environments, exploiting multiple sparse domains that is suitable for static and dynamic scenarios and enables a robust PLA.

In some embodiments, an apparatus for physical layer authentication is provided, the apparatus comprising: a receiver configured to: receive, over a wireless channel, a signal from a communication device after a previous authentication; processing circuitry configured to: determine, based on the received signal, current value of a plurality of physical-layer, L1, parameters of the wireless channel descriptive for a sparse channel; obtain, from a storage, value of the plurality of L1 parameters stored at the previous authentication; and perform authentication of the communication device based on the current value of the plurality of L1 parameters and the value of the plurality of L1 parameters stored.

The above-mentioned circuitry may be any circuitry such as processing circuitry comprising one or more processors and/or other circuitry elements.

Furthermore, a method for physical layer authentication is provided comprising steps of: receiving, over a wireless channel, a signal from a communication device after a previous authentication; determining, based on the received signal, current value of a plurality of physical-layer, L1, parameters of the wireless channel descriptive for a sparse channel; obtaining, from a storage, value of the plurality of L1 parameters stored at the previous authentication; and performing authentication of the communication device based on the current value of the plurality of L1 parameters and the value of the plurality of L1 parameters stored.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of “a”, “an”, and “the” comprise plural referents unless the context clearly dictates otherwise.

BRIEF DESCRIPTION OF THE DRAWINGS

The terms Fig., Figs., Figure, and Figures are used interchangeably in the specification to refer to the corresponding figures in the drawings.

An understanding of the nature and advantages of various embodiments may be realized by reference to the following figures.

Like reference numbers and symbols in the various figures indicate like elements, in accordance with certain example implementations.

DESCRIPTION

Figures 1, 2A, 2B:
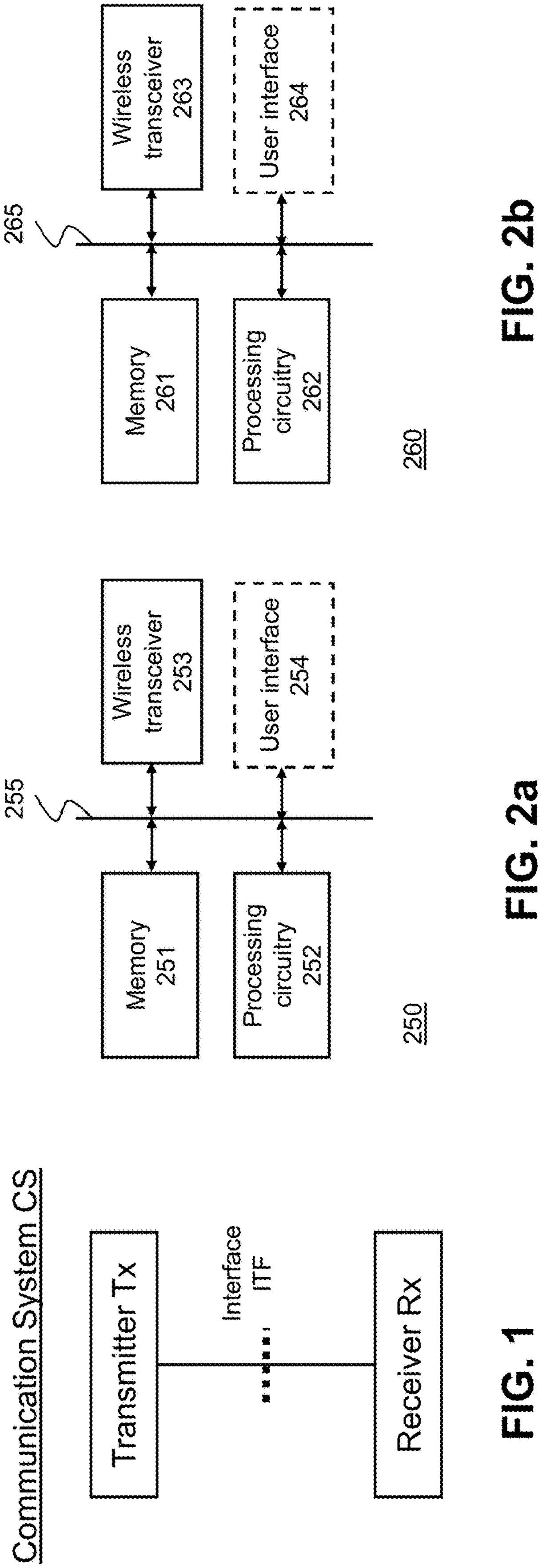
FIG. 1 is a block diagram illustrating an exemplary communication system.
FIG. 2*a* is a block diagram illustrating an exemplary transmitting device to be authenticated by the PLA procedure.
FIG. 2*b* is a block diagram illustrating an exemplary receiving device employing the PLA procedure of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to comprise one or more items and may be used interchangeably with "one or more" and "at least one". Furthermore, as used herein, the term "set" is intended to comprise one or more items (e.g., related items, unrelated items, a combination of related and unrelated items, and/or the like) and may be used interchangeably with "one or more" or "at least one". Where only one item is intended, the term "one" or similar language is used. Also, as used herein, the terms "has", "have", "having", or the like are intended to be open-ended terms. Further, the phrase "based on" is intended to mean "based at least partially on" unless explicitly stated otherwise.

FIG. 1 illustrates an exemplary communication system CS in which Tx represents a transmitter and Rx represents a receiver. The transmitter Tx is capable of transmitting a signal to the receiver Rx over an interface ITF. The interface may be, for instance, a wireless interface. For example, the wireless interface may be implemented by a single antenna of transmitter Tx and/or receiver Rx. Alternatively, the wireless interface may be implemented by multiple antennas of the transmitter Tx and/or receiver Tx. The interface may be specified by means of resources, which can be used for the transmission and reception by the transmitter Tx and the receiver Rx. Such resources may be defined in one or more (or all) of the time domain, frequency domain, code domain, and space domain. It is noted that in general, the "transmitter" and "receiver" may be also both integrated in the same device. In other words, the devices Tx and Rx in FIG. 1 may respectively also comprise the functionality of the Rx and Tx.

The present disclosure is not limited to any particular transmitter Tx, receiver Rx and/or interface IF implementation. However, it may be applied readily to some existing communication systems as well as to the extensions of such systems, or to new communication systems. Exemplary existing communication systems may be, for instance the 5G New Radio (NR) in its current or future releases, and/or the IEEE 802.11 based systems such as the recently studied IEEE 802.11be, and 6G technologies or the like.

As mentioned in the background section, the fifth generation (5G) and beyond communication systems face diverse demands for applications such as low latency, improved reliability, high data rates, and flexibility. However, the security of the transmitted data between legitimate nodes is still a major concern that needs to be addressed; this is due to the open and broadcast nature of wireless communication that makes it susceptible to various attacks, the latter aims to target different security services such as data confidentiality, message integrity, and node authentication. Thus, communication must be extremely secure and protected against those malicious threats.

Physical layer authentication (PLA) is an aspect of security, which aims to distinguish between authorized and unauthorized entities by using physical layer attributes of devices and environments. This is done by leveraging the inherent randomness in wireless communication channels and/or the unique features of hardware fabrication processes to harvest entropy and provide authentication. As noted above, PLA techniques can be broadly classified into two categories: channel-based schemes and radio frequency (RF)-hardware-based. Channel-based PLA exploits wireless channel parameters, whereas RF-hardware-based PLA exploits imperfections of devices and RF components. Although the hardware-based techniques provide better authentication performance in mobility scenarios than the channel-based ones, extra hardware components are needed to detect and recognize the RF hardware features of the legitimate end nodes. The aforementioned schemes are limited to multipath environments and fail in sparse conditions. In sparse channel design, few works on efficient PLA schemes in sparse static system design exist. However, these works are limited to the static sparse environment; their proposed methods are not resilient to channel variations and cannot be applied in highly dynamic environments.

Channel-based PLA exploits wireless channel parameters, such as channel state information (CSI), received signal strength (RSS), channel frequency response (CFR), and channel impulse response (CIR). The RF-hardware-based PLA, on the other hand, relies on the imperfections of devices and RF components. In general, radio frequency (RF) hardware-based PLA techniques provide a more stable signature against channel variations in dynamic environments. For example, in-phase/quadrature imbalance (IQI), digital-to-analog converter, and carrier frequency offset (CFO) imperfections are exploited for creating an RF fingerprint to identify and authorize the legitimate nodes. Although the hardware-based techniques provide better authentication performance than the channel-based ones, extra hardware components are needed to detect and recognize the RF hardware features of the legitimate end nodes. As a consequence, to reduce the cost and to allow for a better and faster authentication mechanism, a tracking-based PLA design has been introduced to deal with the dynamicity of the propagated channel in vehicle-to-everything (V2X)

communication systems. Note that the techniques mentioned above depend on the assumption that the channel is rich enough to be able to detect and extract the RF and channel features from the received signals. The term rich means that the wireless communication environment has a large amount of channel paths (e.g., between one or more transmitters Tx and one or more receivers Rx) typical for line-of-sight (LOS) environments, and indirect channel paths due to multiple scattering of the wireless signal by obstacles (e.g., buildings, etc.). As a result, in rich environments, there is a larger number of individual wireless paths from which channel and RF features may be detected and extracted.

In new-generation wireless networks, operating at high frequencies is one major key to satisfy the new requirement of larger spectral channels to provide a huge system data rate. The strong path loss of wave propagation at these frequencies necessitates the infrastructure nodes to acquire multiple antenna structures. This can provide unprecedentedly high-bandwidth data transmission to multiple users with different requirements at the same time-frequency resource via fine-grained beamforming. However, the effective wireless propagation environment at high frequencies comprises only a small number of strong propagation paths, such as a line-of-sight (LoS) component and a few first-order reflections. This exhibits the effective channel response to have a sparse nature. Such environments having direct path (i.e., LoS path) and/or few reflections (e.g., due to only few reflecting obstacles) may be referred to as poor scattering wireless environments. In these circumstances, conventional PLA methods that rely on having a rich scattering environment are no longer adequate for the new effective channels. As a result of the poor scattering environment, sparse channel responses have a higher probability to be predicted and to be regenerated at the attacker node, which highly reduces the authentication performance between the legitimate nodes. This is because the authentication methods rely on the assumption that the effective channel between the nodes is rich enough to build a strong and unique physical layer signature. However, this assumption may no longer apply in poor scattering environments, so that the secure connection can be easily broken by the attacker.

Furthermore, in the 5G and beyond communication technologies with a dynamic environment such as unmanned aerial vehicles (UAVs) and V2X, due to the mobility issue, users may need to frequently change between the channels and/or the access points, which in turn leads to frequent authentication processes. The current PLA techniques are considered unstable and vulnerable to sudden changes in the dynamic environment.

To this point, the sparseness of the channel (i.e., poor scattering channels) is only exploited at one domain, i.e., the angle domain, while other sparse domains (e.g., delay and Doppler domains) can be also exploited for providing a robust PLA scheme that is vulnerable to channel variation in different environmental conditions.

The disadvantages of the previously proposed authentication schemes can be summarized as follows:

- Most of the conventional PLA works are limited to the static sparse environment; so that their proposed methods are not resilient to channel variations and cannot be applied in highly dynamic environments (e.g., environments with high degree of mobile users).
- The PLA schemes that are based on AI techniques such as machine learning mechanisms need a sufficient amount of training data to address the dynamics of multiple antenna channels, which increases the complexity overhead and introduces latency to the system.
- The hardware-based PLA techniques that tackle the dynamic environment rely on the assumption that the channel is rich enough to detect and to extract the RF features, which is not the case in current systems where the channel is sparsely scattering.
- Security cannot be guaranteed in case of co-located attacks (i.e., the attacker is close to a user to be hacked), where the attacker approaches legitimate users to obtain the channel state information. The current PLA schemes work only when the attacker is at a different location from the legitimate user. Therefore, co-located attacks pose a significant security risk in current and next-generation communication networks.
- The sparseness of the channel is only exploited at one domain, i.e., the angle domain, while other sparse domains, such as delay domain, Doppler domain, angle-delay domain, angle-Doppler domain, delay-Doppler domain, or any sparse domain(s) suitable for characterizing the channel, can be also exploited for providing a robust PLA scheme that is vulnerable to channel variation in different environmental conditions.
- The PLA techniques are only effective in time division duplex (TDD) transmission mode and fail in frequency division duplex (FDD) mode.
- The need to authorize multiple legitimate nodes simultaneously under different channel conditions is still an open challenge to the PLA techniques in the current and next-generation communication networks.

The present disclosure provides an approach for physical layer authentication, which exploits different sparse domains jointly or independently in both static and dynamic environments to enhance physical layer authentication. As discussed in the following, the present disclosure may provide one or more of the following solutions in view of above discussed problems:

1. Presenting a unified authentication technique robust to different attacker types, where it can be used in next-generation communication system scenarios and requirements, and is applicable in both static and dynamic environments.
2. Improving the stability of the authentication process in rapidly changing channels by incorporating tracking methods using different tracking filters.
3. Applicability of the PLA techniques in both TDD and FDD transmissions, thereby breaking the strict appliance of current PLA techniques to only TDD transmission modes. This is possible because of the angle reciprocity property in multiple antenna networks. The property of angle reciprocity means that, for two connected (communicating or signal exchanging) nodes, the transmission angle at one node is equal to the reception angle at the same node, and the same holds for the other node. In general, the reciprocity theorem essentially states that the channel responses between two nodes in a wireless communication system will be the same. In other words, for two nodes A and B, the channel response (CR) from A to B (CR (A→B)) will be equal to the channel response from B to A (CR (B→A)).
4. Offering a flexible multi-dimensional approach for multi-user authentication, which leads to increased system capacity by allowing differentiation among users and the detection of attackers.

Figure 3:
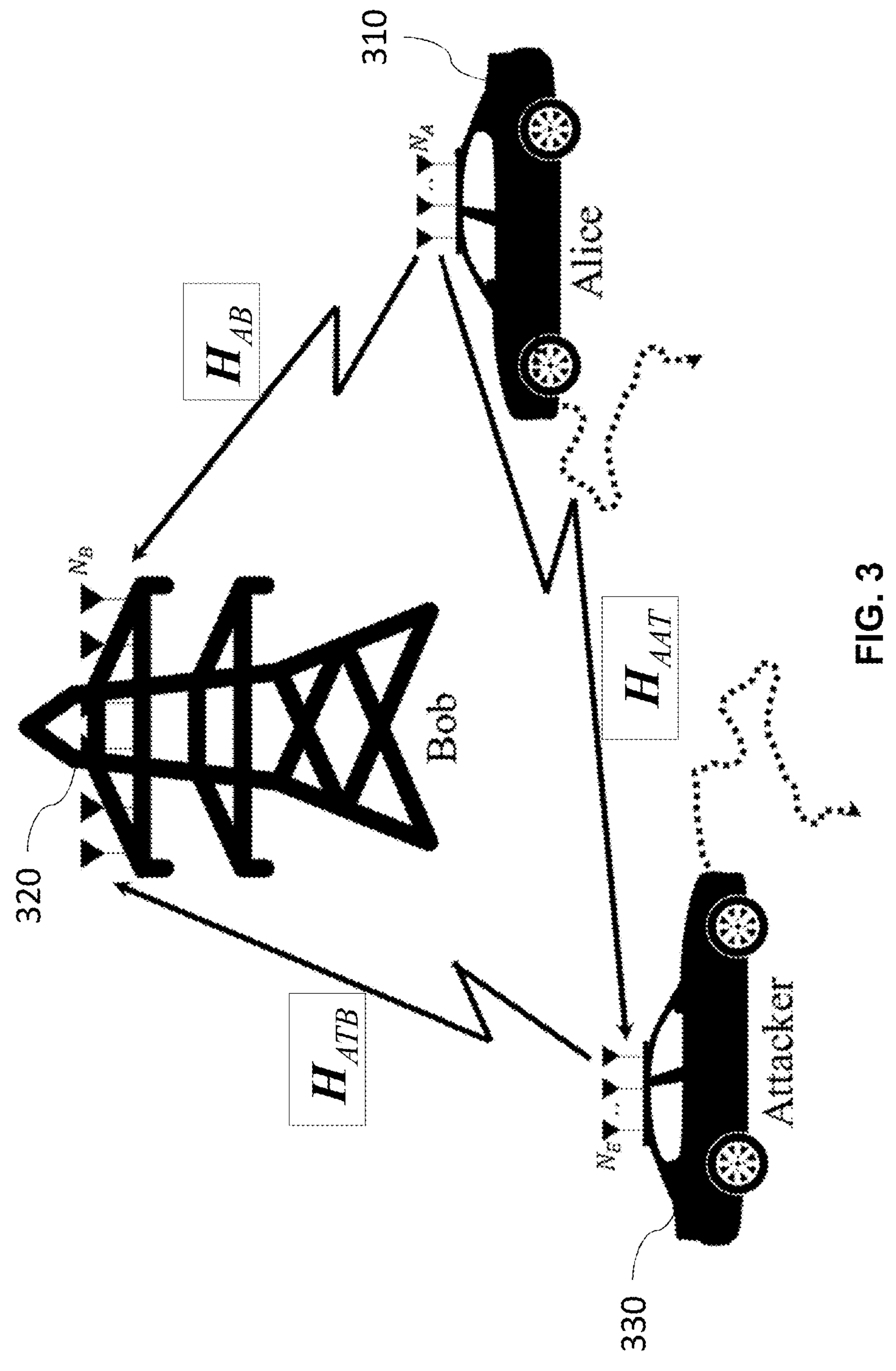
FIG. 3 is an illustration of a system model including communication partners Bob, Alice, and attacker. Bob receives a signal composed of a signal of Alice, a signal of the attacker, or a composition of Alice's and attacker's signals, and verifies authentication of Alice.

In some embodiments, the PLA according to the present disclosure may be illustrated by the system model shown in FIG. 3, which is based on an Alice-Bob-attacker model.

Using the traditional terminology in the security literature, Alice 310 is the legitimate sender who initiates the communication and possesses one or more antenna arrays. Alice can represent any kind of user device or communication device, which aims to create a wireless link (e.g., link $H_{AB}$) and exchange information with other user devices (e.g., mobile terminals, mobile stations (STA)), base stations (BS), or access points (AP) within the wireless network. Bob 320 is the intended receiver (base station or access point with multiple antennas or another STA). An attacker 330 may have the same or higher capability as Alice, and tries to send messages to Bob over a wireless link $H_{ATB}$ in order to impersonate Alice. Hence, Alice and the attacker operate as communication devices, respectively, which may be implemented by transmitting device 25 as shown in FIG. 2*a*.

FIG. 2*a* illustrates a transmitting device 250 according to some exemplary embodiments, which communicates with a receiving device Rx performing the PLA procedure of the present disclosure detailed later. The transmitting device 250 may be a part of any wireless communication device such as a station (STA) or access point (AP), or, in general base station (BS) or terminal (i.e. user equipment UE). The transmitting device 250 comprises memory 251, processing circuitry 252, and a wireless transceiver 253 (or a wireless transmitter 253), which may be capable of communicating with each other via a bus 255. The transmitting device 250 may further comprise a user interface 254. However, for some applications, the user interface 254 is not necessary (for instance some devices for machine-to-machine communications or the like). The transmitting device 250 may be the transmitter Tx of the communication system CS.

The memory 251 (also referred to as storage) may store a plurality of firmware and/or software modules, which implement some embodiments of the present disclosure. The memory may 251 be read from by the processing circuitry 252. Thereby, the processing circuitry may be configured to carry out the firmware/software implementing the embodiments. The processing circuitry 252 may comprise one or more processors, which, in operation, prepare data for transmission. In some embodiments, the circuitry 252 is configured to map sequential portions of the data onto respective modulation symbols according to a target modulation. In an implementation example, the target modulation is one or more of phase shift keying, PSK, pulse amplitude modulation, PAM, and/or quadrature amplitude modulation, QAM, but may not be limited to the target modulations listed. For example, amplitude phase shift keying (ASK) or frequency shift keying (FSK) may be also used to map sequential portions of the data onto respective modulation symbols according to ASK or FSK. A further option is to combine target modulations. As such it is understood, that the above-listed target modulations also cover their respective subsets. PSK, for example, covers BPSK, DPSK, M'ary PSK, QPSK, OQPSK, etc. FSK covers BFSK, M'ary FSK, MSK, GMSK etc. ASK covers on-off keying, M'ary ASK etc. QAM is commonly referred to as M'ary QAM covering rectangular QAM or circular QAM. The modulation symbols comprise a first modulation symbol and a second modulation symbol. In some embodiments, BPSK or QPSK are used to generate the modulation symbols. Such lower-order modulations are robust and their application for pairing modulation may provide further improvement as discussed herein.

The wireless transceiver 253 is configured to transmit a signal to the receiving device Rx showing in FIG. 2*b* which may operate as further detailed below. Before passing the signal to an analog front comprising a single or multiple antennas, the transceiver may perform possibly further operations. Such further operations may comprise an inverse transformation such as the inverse fast Fourier transform (IFFT) or inverse discrete cosine transform (IDCT), in accordance with the desired (orthogonal or non-orthogonal) frequency division multiplex. Moreover, the transformed time-domain symbols may then be modulated onto the actual carrier, amplified or the like.

In some embodiments, the transmitting operation of the transceiver 253 comprises further orthogonal frequency division multiplex, OFDM, modulation of the carriers comprising carriers carrying the symbols of the signal. Alternatively, non-OFDM waveforms may be used for modulating the carriers that carry the respective symbols, which are transmitted using a single antenna. Alternatively, the symbols may be transmitted using multiple antennas.

As FIG. 2*a* shows, the memory 251 may be separated from the processing circuitry 252. However, this is only an example. In general, the memory 251 may be implemented within the processing circuitry 252, and e.g., within the one or more processors. The term "memory" refers to any type of long term, short term, volatile, nonvolatile, and/or other memory and is not to be limited to any particular type of memory or number of memories, or type of media upon which memory is stored.

The wireless transceiver 253 may operate according to some known resource multiplexing and/or multi-user multiplexing scheme. In general, any currently used scheme such as those employed in the IEEE 802.11 framework or in the 5G/6G framework are applicable. In some embodiments, possible examples comprise the OFDM, OFDMA, or non-orthogonal multiple access (NOMA) or the like.

As illustrated in FIG. 3, Alice 310, Bob 320, and attacker 330 may be referred to as nodes forming a communication network, with wireless links $H_{ATB}$, $H_{AAT}$, and $H_{AB}$ between the attacker (AT), Alice (A), and Bob (B), respectively. The nodes may correspond to the transmitting device 250 and receiving device 260 in FIGS. 2*a* and 2*b*, respectively, and their processing is described in the following in view of the PLA procedure of the present disclosure. The objective of PLA is to enable Bob to recognize messages from Alice as genuine and reject those messages from the attackers. In other words, Bob receives messages from legitimate Alice and/or the illegitimate attacker, and Bob has to authenticate Alice as legitimate and the attacker as being non-legitimate. All nodes may be equipped with multiple antenna arrays in a uniform linear manner for simplicity. Alternatively, the nodes can be also equipped with other types of arrays, such as uniform/non-uniform planar array, circular array, cylindrical array, etc. The channel between the nodes is assumed to be a sparse, multipath, time-varying channel.

The PLA process of the present disclosure comprises two stages: training and verification. In the training stage, Bob verifies Alice's identity using higher-layer protocols and extracts a unique physical layer signature from the received signal, which is stored in a database. This stage assumes that only Alice and Bob nodes exist.

The receiving device performing the PLA process may be implemented as shown in FIG. 2*b*. Hence, in this example, the receiving device represents Bob that aims verifying the transmitting device 250 representing Alice. Note that the another transmitting device 250 represents the attacker, and the receiving device 260 aims to successful authenticate Alice, while rejecting the attacker. FIG. 2*b* illustrates a receiving device 260 according to some exemplary embodiments. The receiving device 260 comprises memory 261, processing circuitry 262, and a wireless transceiver 263 (or a wireless receiver 263), which may be capable of communicating with each other via a bus 265. The receiving device 260 may further comprise a user interface 265. However, for some applications, the user interface 265 is not necessary (for instance some devices for machine-to-machine communications or the like).

The memory 261 may store a plurality of firmware or software modules, which implement some embodiments of the present disclosure. The memory may 261 be read from by the processing circuitry 262. Thereby, the processing circuitry may be configured to carry out the firmware/software implementing the embodiments. The processing circuitry 262 may comprise one or more processors, which, in operation, determines data.

In some embodiments, the processing circuitry 262 performing the functions described herein may be integrated within an integrated circuit on a single chip. The processing circuitry may also implement a control function to control the transceiver 263 to receive the signal. The transceiver 263 is configured (e.g., by the processing circuitry) to receive a signal and obtain symbols carried therein. For example, the processing circuitry 262 may configure (control) the transceiver 263, over the bus 265, to receive the signal. The transceiver may be, for example, a wireless transceiver obeying some standard or some pre-defined rules in order to comply with the transmitter, e.g., the one described with reference to FIG. 2*a*.

In some embodiments, the communication device (e.g., representing Alice) has been previously authenticated, and transmits over a wireless channel a signal to the receiving device 260 (representing Bob). Such previous authentication may be performed in an upper layer. The upper-layer is higher than the physical layer within which the PLA is performed. An upper layer authentication may be based on an extensible authentication protocol (EAP)-based authentication methods and/or transport layer security (TLS)-based methods.

The transceiver/receiver 263 is configured to receive the signal from the communication device such as the transmitting device 250 of FIG. 2*a*. The processing circuitry 262 may comprise one or more processors, which is/are configured to determine the data from symbols carried by the signal. Thereby, it is assumed that sequential portions of the data are mapped onto respective modulation symbols according to a target modulation. The processing circuitry 262 may comprise one or more processors, which is/are configured to determine, based on the received signal, current values of a plurality of physical-layer L1 parameters of the wireless channel that describe a sparse channel. The plurality of L1 parameters comprise one or more of distance, azimuth angle, and elevation angle. A storage holds the L1 parameters stored at the previous authentication. For example, the L1 parameters may be stored in memory 261 of receiving device 260. The processing circuitry 262 obtains the stored L1 parameters from memory 261 and performs the authentication of the transmitting device 250 from which signal is being received, based on the current values of the L1 parameters and the values of the stored L1 parameters. The result of said authentication may be positive (i.e., the communication device is legitimate) or negative (i.e., the communication device is non-legitimate).

In general, at the receiver, before the above-mentioned processing, the signal may be received over a single antenna of the receiver or multiple antennas, amplified, and transformed into a specific domain (e.g. frequency and/or angle domains) by a transformation, such as FFT or DFT (Discrete Fourier Transformation), corresponding to the respective inverse transformation which has been applied at the encoder.

From a geometric channel model, the time-varying channel for a point-to-point connection associated with the n-th transmission antenna (integer n=0, 1, 2, . . . , $N_A-1$) to the m-th reception antenna (integer m=0, 1, 2, . . . , $N_B-1$) at time r may be represented as channel model taking the form of:

$$h_{m,n,l}(r) = \sum_{i=1}^{L_p} \alpha_i \, e^{-j2\pi(f_c+v_i)\tau_i} e^{j2\pi v_i r T_s} e^{j2\pi(f_c+v_i)n\frac{d}{c}\sin\theta_i} e^{-j2\pi(f_c+v_i)m\frac{d}{c}\sin\phi_i} \delta\left(\ell T_s - \tau_i - n\frac{d}{c}\sin\theta_i - m\frac{d}{c}\sin\phi_i\right)$$

where d is the antenna spacing, c is the speed of light, $f_c$ is the carrier frequency, $T_s$ is the system sampling period, $L_p$ is the number of dominant propagation paths, $\alpha_i$ is the complex channel path gain, $\tau_i$ is the path delay, $v_i$ is the Doppler frequency, $\ell$ denotes the index along a delay domain, r represents the time index, δ(•) denotes the Dirac delta function, $\theta_i$ is the Angle of Departure (AoD) at the i-th path, and $\phi_i$ is the Angle of Arrival (AoA) at the i-th path.

The parameters $\{\alpha_i, \tau_i, v_i, \phi_i\}$ for all $L_p$ propagation paths characterize the response of the channel in account of all dominant propagation paths. The channel response $h_{m,n,\ell}$ (r) comprises information on the response channel Alice-Bob $H_{BA}$ and, in case of an attacker's presence, the response channel Bob-attacker $H_{BAT}$, along with the channel response $H_{ATA}$ between the attacker and Alice who is possibly hacked by the attacker.

The plurality of L1 parameters comprise at least one of $\tau_i$, $L_P$, $\theta_i$, $v_i$, and $\phi_i$. Whether a propagation path i is dominant may be determined based on the RSSI of the respective path by comparing said RSSI to a predefined threshold. If the RSSI of a propagation path among the number of $L_P$ propagation paths is equal to and larger than the predefined threshold, the respective progagation path is determined as being dominant. The predetermined threshold for the RSSI may be any value defined by the system (previously set) or may be predefined by the noise floor. The noise floor may be considered as the minimal bound for the RSSI for a propagation path being dominant, but may in addition define existence of a propagation path in general if its respective RSSI exceeds the noise floor.

Note that, due to the sparsity, only a few dominant reflections exist, so that $L_P$ is typically very small. Usually, there are only a few scatterers in the transmission environment. Hence, very small means that the number of dominant propagation paths in a sparse communication environment is smaller than in case of a dense communication environment. For example, a typical number of dominant paths in a sparse environment is Lp=100, while for a non-sparse Lp=10,000. Hence, in this example, Lp differs by two orders of magnitude.

To define the sparsity of the delay-Doppler domain, power distribution in the delay-Doppler domain may be used. For example, a transformation to delay-Doppler bins may be examined and determined how many of these bins contain significant signal power. For example, if most of the power is concentrated in only a few delay-Doppler bins, and the rest have negligible power, then the delay-Doppler domain can be considered sparse. The sparsity can be quantified by calculating the percentage of significant bins compared to the total number of bins in the delay-Doppler grid.

For example, there may be a power threshold thr1, above which signal power is considered to be significant and below (or equal to) which the signal power is considered as not significant. As power threshold thr1, the noise power may be used, for example. There may be a percentage threshold thr2. If thr2 or less percent of bins in the delay-Doppler grid have significant power, then the delay-Doppler domain is sparse. On the other hand, if more than thr2 percents of bins in the delay-Doppler grid have significant power, then the delay-Doppler domain is not sparse. In some embodiments, thr2 is a value below 0.5 (i.e., below 50%). For instance, thr2 may be 40% or 30% or 25% or 10% or the like.

The angle domain may be particularly relevant in the context of multiple-input-multiple-output (MIMO) wireless systems, where the channel can be characterized by the angles of arrival (AoA) and angles of departure (AoD) of the transmitted and received signals, respectively. To define the sparsity of the angle domain, the angles of significant signal paths may be analysed. If the wireless channel predominantly has a few dominant angle paths, and the rest have negligible power, then the angle domain can be considered sparse. The sparsity can be quantified by calculating the percentage of significant angles compared to the total possible angular range.

Similarly as in case of the delay-Doppler domain, there may be a power threshold thr3, which may be but does not have to be the same as thr1. Above thr3, signal power is considered to be significant and below (or equal to) thr3 the signal power is considered as not significant. There may be a percentage threshold thr4. If thr4 or less percent of angle paths have significant power, then the angle domain is sparse. On the other hand, if more than thr4 percents of angle paths have significant power, then the angle domain is not sparse. In some embodiments, thr4 is a value below 0.5 (i.e. below 50%). The value of thr4 may be but does not have to be same as thr2. The value of thr4 may depend on system requirements on authentication and/or complexity. The thr4 value may be configurable.

Sparsity of the delay-Doppler-angle domain refers to the property of having a relatively small number of significant elements in a three-dimensional representation that combines the delay, Doppler shift, and angle information of the wireless channel. To define the sparsity of the delay-Doppler-angle domain, the three-dimensional representation of the channel response may be analyzed and it may be determined how many elements (of the space delay, Doppler shift, angle) contribute significantly to the overall channel behavior. If only a few specific delay-Doppler-angle elements contain significant signal power, while the majority have negligible power, then the delay-Doppler-angle domain can be considered sparse. The sparsity can be quantified by calculating the percentage of significant elements compared to the total number of possible elements in the three-dimensional grid.

Similarly as in the above-mentioned examples of delay-Doppler grid and angle paths, there may be a power threshold thr5, which may be but does not have to be the same as thr1 and/or thr3. Above thr5, signal power is considered to be significant and below (or equal to) thr5 the signal power is considered as not significant. There may be a percentage threshold thr6. If thr6 or less percent of delay-Doppler-angle domain element have significant power, then the delay-Doppler-angle domain domain is sparse. On the other hand, if more than thr6 percents of delay-Doppler-angle domain element have significant power, then the delay-Doppler-angle domain is not sparse. In some embodiments, thr6 is a value below 0.5 (i.e. below 50%). The value of thr6 may be but does not have to be same as thr2 and/or thr4. The value of thr6 may depend on system requirements on authentication, and may be configurable.

The above three examples are not to limit the present disclosure, there may be different domains of which the sparsity is considered, e.g., angle-delay domain or combinations of different parameters (e.g., at least one different from delay, Doppler, or angle) or any further domains. The corresponding thresholds may then be defined for those domains as described in the examples above.

The channel transformation to the delay-Doppler-angle domain can be done as described in the article "A New Path Division Multiple Access for the Massive MIMO-OTFS Networks" by M. Li et al. An example of a 3D sparse channel may be the delay-Doppler-angle domain. Assume that the x-axis with index x represents the delay domain, y-axis with index y represents the Doppler domain, and z-axis with z index represents the angle domain. These indices x, y, and z specify a path and hence the channel, which is modeled by the above expression for $h_{k,\ell,n,m}$.

For a given reference point of (0,0,0), assuming that path i has ($x_i$, $y_i$, $z_i$) as point index, the distance $d_i$ to the i-th path in the 3D domain can be extracted and calculated as follows:

$$d_i = \sqrt{x_i^2 + y_i^2 + z_i^2}$$

The azimuth angle to the given distance is:

$$\varphi_i = \tan^{-1}\frac{y_i}{x_i}$$

and the elevation angle to the given distance is:

$$\omega_i = \tan^{-1}\frac{\sqrt{x_i^2 + y_i^2}}{z_i}$$

Each of the values of $d_i$, $\varphi_i$, and $\omega_i$ are extracted for each propagated path, with said values representing, in this example, three features for the respective path. In other words, distance, azimuth angle, and elevation angle are used in combination to create a unique signature (physical layer parameters) for authentication. For multiple paths, a feature vector is generated for the respective features distance, azimuth, and elevation. Hence, in this example, there are three feature vectors comprising a distance vector, azimuth vector, and elevation vector. In case there are N paths (i.e. N channels with N being an integer equal to 1 or larger), the respective feature vectors have N components. In this example, the sparse domain is 3D. However, higher-dimensional sparse domain may be feasible by accounting for additional domains different from delay, Doppler, and angle, so that the number of different features may be increased or decreased.

A novel sorting mechanism can be used to arrange the values in the extracted feature vectors. In other words, values of the determined plurality of L1 parameters descriptive for a sparse channel may be sorted. As noted before, the plurality of L1 parameters comprise one or more of distance, azimuth angle, and elevation angle. For example, the values of the plurality of L1 parameters can be sorted in descent/ascent order in each vector independent from other vectors values. An individual sorting order may be configured dependent on the selected L1 parameter. Moreover, the sorting order may depend on the dimension of the sparse domain representing the channel. Besides the sparse dimension (e.g., 1D, 2D, 3D, etc.), the sorting order may also depend on the L1 parameter(s) defining the respective sub-dimension of the sparse domain. For example, for a 2D domain, the sorting order for selected L1 parameters distance and azimuth angle may differ from the selected L1 parameters azimuth angle and elevation angle. In this case, the distance may be sorted in ascending order, while the azimuth angle and/or elevation angle may be sorted in descending order. Which sorting order is used may depend also on the scenario. For example, in case of a high-speed train scenario where the channel response varies rapidly, the values of the plurality of L1 parameters distance, azimuth angle, and elevation angle may be sorted in ascending order. This means that the components of the respective feature vector carry first the smaller values of distance, azimuth angle, and elevation angle, and the last entries carry the larger values. Therefore, the smaller values of the L1 parameters may be quickly read as they are the first entries in their respective feature vector, so that the PLA procedure may be performed rapidly in the fast-changing scenario of a high-speed train.

The order of sorting may not be limited by mere descending or ascending order. Another way of sorting the values of the plurality of L1 parameters can be sorting the values of one selected L1 parameter (e.g., the distance) in descent/ascent order, while the location of the values of the selected remaining L1 parameters (e.g., azimuth angle and elevation angle) follows the location of their corresponding distance value. In other words, the order of the components in the vector corresponding to the selected L1 parameters azimuth angle and elevation angle is the same as the order of the components of the distance vector after sorting. Hence, the arrangement of the components of all feature vectors corresponding to the selected plurality of L1 parameters may be determined by a single condition imposed for sorting the values of one among the selected plurality of L1 parameters. In other words, the order in which the values of the L1 parameters are arranged in their respective feature vector is determined by the order of arranging the values of a specific L1 parameter. In turn, the values of said specific L1 parameters are sorted by imposing a condition on the values of the specific L1 parameter, but not (necessarily) on the location of the values within the respective feature vector. Choosing a specific sorting mechanism (i.e., sorting condition) may be based on the channel conditions and system scenario to provide the best authentication performance to the given system. Typical system scenarios may comprise, for example, mobile communication, indoor communication, communication in high-speed trains, etc. In these examples, a static channel may be in the indoor scenario, while a moderately varying channel may exist in the mobile communication scenario, and a highly varying channel may exist in the high-speed train scenario. In case of a static channel, the channel path gain can be taken as a reference for sorting. The feature "channel path gain" is sorted in descending/ascending order, starting from its corresponding strongest/weakest channel gain to the weakest/strongest value of the channel gain, respectively. On the other hand, if the channel has variation as in mobile communication or high-speed train scenarios, the channel variation makes the channel path gain unstable, and hence is not suitable for sorting. Therefore, the above feature values can be used for sorting. For example, taking the distance vector as feature, the sorted-distance vector may be sorted from the minimum value in the vector to the maximum value (i.e., ascending order), and the azimuth and elevation vectors are sorted based on its corresponding distance index. A similar procedure can be applied to the azimuth vector and the distance and elevation vectors are sorted, based on the indices of the sorted values of the azimuth vector. Alternatively, the values elevation vector can be sorted first as well. In other words, in this way of sorting the entries of the feature vectors, the vector used first for sorting its values determines the respective indices that are used for sorting the entries of the subsequent feature vectors. The process of sorting may be performed by processing circuitry 262 of receiving device 260 of FIG. **2*b* representing Bob 320 in FIG. 3**.

After sorting, three unique features vectors (d, φ, and ω) can be stored to the database as a unique signature to the PLA scheme at the training stage of the authentication process.

In the above example, the dimension of the sparse domain is 3D comprising three L1 parameters that are descriptive of the sparse channel. Typically, the number of L1 parameters that may be extracted may be larger than the number of L1 parameters needed to describe the sparse channel. In other words, the above mode of the channel may be already well described by a few L1 parameters. Hence, L1 parameters descriptive of the sparse channel may be selected from the (larger set of) L1 parameters. For example, the processing circuitry 262 of receiving device 260 (i.e., Bob) may be selected from the plurality of L1 parameters one or two parameters, in which case the dimension of the sparse domain would be 1D or 2D. For 1D, the L1 parameter may be one of distance, azimuth angle, and elevation angle. For 2D, the L1 parameters may be a paired combination of two parameters among the L1 parameters distance, azimuth angle, and elevation angle.

In addition, the sparse domain itself may be selected. The selecting processing may be performed by processing circuitry 262 of receiving device 260. For example, as sparse domain, any of a Doppler domain, azimuth angle domain, and elevation angle domain may be selected as a sparse domain in 1D. Alternatively or additionally, any of Doppler-delay domain, Doppler-angle domain, and delay-angle domain may be selected as a sparse domain in 2D. As a sparse domain in 3D, the Doppler-delay-angle domain may be selected. These domains are examples for domains in 1D, 2D, and 3D, and are not limited to the above list. Any other domain suitable to describe a sparse channel may be selected, comprising domains in larger dimension than 3D. As evident in the above listed domain examples, the number of the plurality of L1 parameters may be larger than the dimension of the sparse domain. This means that any sparse domain in 1D, 2D, 3D, etc. may be represented by different L1 parameter(s) and/or different combinations of two or more of the plurality of L1 parameters. Which of one or more of the plurality of L1 parameters is selected may depend on the system scenario. It is noted that, in the above examples, the parameters azimuth angle and elevation angle specify each an angle domain in 1D. Hence, if azimuth angle and elevation angle are selected among the plurality of L1 parameters, the respective domain would be a 2D angular domain spanned by two parameters related to angle. Therefore, the actual dimension of the sparse domain may be determined by the number of parameters selected among the plurality of L1 parameters, with two or more L1 parameters referring to the same domain (e.g. angle domain). Before the particular sparse domain is selected, the dimension of the sparse domain may be selected, for example, by the processing circuitry 262. Since there are typically plural sparse domains having the same dimension, the selection of the dimension of the sparse domain may accelerate the subsequent selection of the sparse domain. In other words, the sparse domains may be grouped with respect to a dimension group, such as group 1D, group 2D, and group 3D, etc..

The selection may be performed based on the sparsity (more sparse domains may be more preferable than the less sparse domains) and/or based on a predetermined order of preference. The selection may further depend on the system requirements. For example, for a system where the security is of high concern, a domain with low sparsity (i.e., richer channel) may be selected to ensure extraction of a large number of channel signatures. On the other hand, for a system where latency is of high concern, the sparsest domain (i.e., most poor channel) may be selected so as to have a small number of channel signatures, but which still provide an overall robust signature for authentication.

In general, L1 parameters may take different values over a certain range, which may be extended (i.e., a total range). An L1 parameter that is descriptive for the sparse channel may be an L1 parameter whose value range determined for the wireless channel is lower than the total range of the L1 parameter. For example, the L1 parameter is an L1 parameter for which a ratio of the value range determined for the wireless channel and the total value range of the L1 parameter is lower than a predefined value.

The predefined value may be, e.g., lower than 0.5. However, this is only an example. As mentioned above, the predefined value may differ for different domains (cf. thr2, thr4, thr6 as examples of the predefined value mentioned above) or be the same. For some domains, it is conceivable that the predefined value of the L1 parameter may be equal to or larger than 0.5. Whether an L1 parameter of the wireless channel is descriptive for a sparse channel may be determined in that the value range applies to an accumulated value alternatively, as opposed to putting a threshold for each bin of the L1 parameter alone. By using an accumulated value of the L1 parameter, the condition to determine whether the L1 parameter is descriptive for a sparse channel is more restrictive. This is because one or more values of the L1 parameter may have a value range each being lower than a total value range. Hence, the L1 parameter would be descriptive for the sparse channel. In turn, by accumulating the values of the L1 parameter, the accumulated value may not be lower than the total value range, so that the L1 parameter would not be suitable to describe a sparse channel. Therefore, considering accumulated values of an L1 parameter allows determining and/or selecting an L1 parameter representing a sparse channel at varying degree of sparsity. A value of a predefined threshold thr7 may be used to compare the accumulated value. If the accumulated value is lower than or equal to thr7, the L1 parameter is descriptive for the sparse channel. If the accumulated value is larger than thr7, the L1 parameter is not descriptive of the sparse channel. Instead of an accumulated value, a ratio thr8 of a value range of an accumulated value may be used.

Using the example of power distribution in the delay-Doppler domain, the power of transformed delay-Doppler bins may be accumulated, and those bins represent the strongest power of 90% power compared to the accumulated power of all bins. Hence, thr8=90% in this example. It is noted that the higher the value of thr8, the larger is the overhead for accumulating bins. Therefore, based on the overhead of the system complexity, a different value of thr8=90% may be suitable, comprising values of thr8 of 80%, 70% etc. or any value of percentage. For example, assume that the system is sensitive to latency, it may be sufficient to use an accumulated bins power of 70%. This means that a fewer number of bins may be used in the power accumulation for the authentication process, so that the authentication may be executed quickly. In turn, if the accumulated bins power is set to 80% or 90%, more bins are used for the authentication process, resulting in a slower execution of the authentication process as for 70% bins power. Hence, the accumulated bins power (i.e., the accumulation threshold value thr and/or accumulation threshold ratio thr8) may be adapted to jointly optimize system latency, overhead, and authentication speed.

The processing circuitry 262 may authenticate the communication device by comparing the current value of the plurality of L1 parameters with the stored value of the plurality of L1 parameters, which may be stored in memory 261 of the communication device 260. Whether or not the authentication is successful, may be determined based on a predefined condition. In case the predefined condition is fulfilled, the communication device is successfully authenticated. In turn, when the predefined condition is not fulfilled, the communication device is not successfully authenticated. The comparison may be based, for example, on the distance $d_i$ defined above for the case of three L1 parameters for a 3D sparse domain. Comparing the difference between the distance of the current L1 parameters and the distance of the stored L1 parameters against a predefined value (i.e. threshold value), the communication device is legitimate if the difference of said distances is equal to or lower than the threshold value. In turn, when the difference is larger than the threshold, the communication device is non-legitimate and is a attacker. In this example, the predefined conditions is specified in terms of the operation "difference", the L1 parameter "distance", along with thresholding with reference the predefined value and the criteria when (non-) authentication is accepted. It is noted that alternative predefined conditions may be used and may be formulated differently, dependent on the L1 parameter selected. In the above example of using distance, the predefined condition aims to detect a legitimate communication device of the distance representing features of the wireless channel are as close as possible to a reference distance (i.e., reference features) considered as being representative of a legitimate communication device. Moreover, the difference may be calculated based on any metric suitable to measure differences, such as $L_p$-norm with p=1, 2, max or ∞. In case the authentication of the communication device is successful, the stored value is updated by processing circuitry 261 based on the current value. The storage (e.g., memory 261) therefore holds the latest value of the plurality of L1 parameters in accordance with a legitimate communication device. This may avoid authentication failures, i.e. erroneous non-authentications of communication devices that are not attackers.

As discussed above, during the verification stage, Bob (i.e. receiving device 260 in FIG. 2*b*) detects and extracts the signature from the received signal and compares it with the stored signature in the database (e.g. memory 261) to verify the identity of the transmitter node (i.e. transmitting device 250 in FIG. 2*a*) as being legitimate or not. However, due to the high channel variation in dynamic environments, a database signature mismatch can occur, leading to authentication failures, even though transmitting device 250 may be legitimate. Thus, in dynamic environments where the channel characteristics may change more strongly than in static environments due to movement of the communication device, the likelihood of erroneous authentication failures is higher than in static environments.

To address this problem, an additional stage—called the tracking stage—is introduced into the PLA process, where the physical layer database signature in response to channel variations is tracked and updated. The tracking and updating may be performed by the processing circuitry 262 of receiving device 260, with the value of the plurality of L1 parameters being updated in the storage (e.g. memory 261). Through the iterative updates of the signature over time, the tracking stage minimizes the mismatch between the signature observed in the training and verification stage, thereby improving the authentication system's performance in dynamic environments and results in a longer authorized connection period. The iterative update over time means that, over a predefined repetition period, the processing circuit 262 repeatedly executes i) determining the current value of the plurality of L1 parameters, ii) authenticating of the communication device, and iii) updating of the data base. In other words, the predefined repetition period or sampling period specifies the distance $\Delta t$ between time instances, for example, $t_i$ and $t_{i+1}$ at which the PLA procedure is executed, along with updating of the stored value of the plurality of L1 parameters. Hence, the repetition period may be considered as the period that determines the rate (i.e., $1/\Delta t$) at which the PLA is performed. The stored value is updated when the difference between current value of the plurality of L1 parameters and the stored value of the plurality of L1 parameters is smaller than a predetermined threshold. As discussed before, the value of the plurality of L1 parameters may be the distance $d_i$. Hence, in case there are multiple successful authentications of Alice (i.e. the communication device 260), storage may be updated with the current value of the plurality of L1 parameters that was determined at the last time instance $t_i$. It should be noted that both training and verification stages estimate channel signatures at Bob's end using pilot signals. It is noted that a longer authorized connection period is possible, because the sparse channel representation parameters corresponding to Alice's node and the channel signature change slowly, while abrupt and hence comparatively fast changes are likely being caused by an unauthorized node. This means that by comparing changes occurring in the parameters and/or in the channel signature, a legitimate user may be distinguished from an attacker (i.e., non-legitimate user). The parameters of Alice change slowly due to the correlation between the channels of Alice during the update or moving over time. For example, for Alice being static, the channel of Alice at time $t_{i+1}$ is highly correlated with Alice's channel at time $t_i$, so that the parameters extracted at time $t_{i+1}$ will be correlated with the parameters extracted at time $t_i$. However, the attacker channel is uncorrelated with Alice's channel, so therefore, the attacker's channel parameters are different and uncorrelated to the parameters extracted from Alice's channel. Hence, in the presence of an attacker, there is an abrupt change in the parameters correlation, and this abrupt change can be easily detected and used for attacker detection.

When performing the PLA, the communication device may be not be authenticated, because the change in the value of the plurality of L1 parameters exceeds the predetermined threshold. In this case, the processing circuitry 262 of the receiving device 260 (i.e., Bob) performs an authentication in the upper layer. This means that the transmitting device first has to be authenticated within a layer above the physical layer, and has to pass the upper-layer authentication before proceeding to the PLA (two-stage authentication). Likewise, the processing circuitry 261 executes the upper-layer authentication, but periodically with a predefined tracking period. This means that, even if the communication device 250 has been successfully authenticated, but the time instance $t_i$ at which the PLA has successfully authenticated lies outside the time window (i.e. tracking period), the communication device (i.e., Alice) is handled as if it was an attacker. Imposing such time constraint for PLA improves the security of the authentication processing in that transmitting devices have to undergo a new upper-layer authentication first, before proceeding to the PLA. Hence, the tracking period determines the time duration between two upper-layer authentications.

Figure 4:
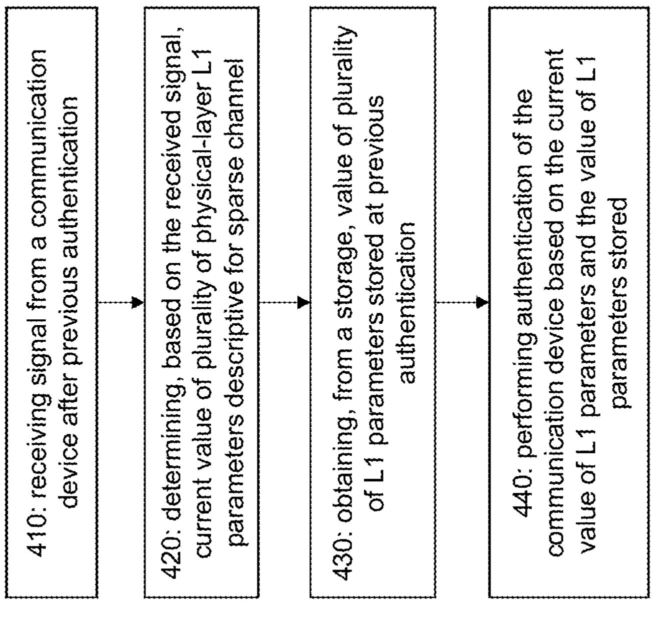
FIG. 4 is a flow diagram illustrating exemplary steps of the PLA procedure according to the present disclosure.

The above-described processing executed by the communication device such as the transmitting device 250 of FIG. 2*b* and the receiving device 260 of FIG. 2*b* have their corresponding procedural steps for the multi-dimensional PLA approach. FIG. 4 shows the PLA procedure according to the present disclosure, where a signal is received from a communication device after a previous authentication (step 410). As noted above, the communication device may be the transmitting device 250 in FIG. 2*a* representing Alice and/or the attacker. In step 420, a current value of a plurality of physical layer L1 parameters is then determined, based on the received signal. The L1 parameters are descriptive of a sparse channel. The plurality of L1 parameters may comprise distance, azimuth angle, and elevation angle vectors. In step 430, a value of the plurality of L1 parameters that are stored in the previous authentication is obtained from a storage. The storage may be the memory 261 of receiving device 261 shown in FIG. 2*b*. The L1 parameters may be stored in a data base that is held by the storage. Finally, based on the current value of the plurality of L1 parameters and the value of the L1 parameters stored, the communication device is authenticated in step 440.

The multi-dimensional PLA procedure of the present disclosure may enable a robust and reliable authentication in environments with few reflections (i.e., sparse domains) and applicable in dynamic and/or static scenarios (i.e., UEs which are mobile and immobile alike).

Figure 5:
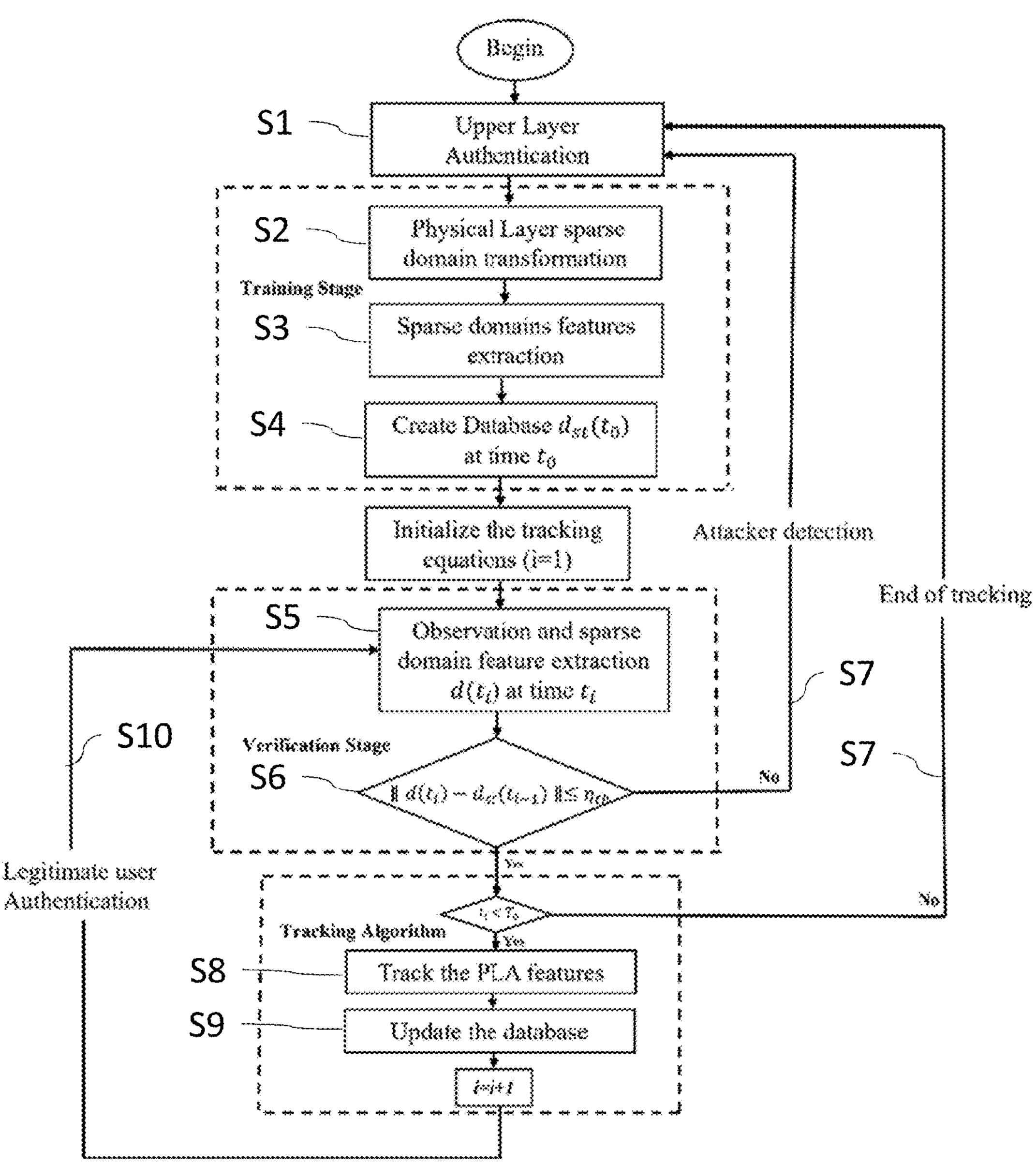
FIG. 5 is a flow diagram illustrating further exemplary steps of the PLA procedure according to the present disclosure.

FIG. 5 provides further flowchart of the PLA procedure comprising additional steps corresponding to processing performed by processing circuitry 261 in some embodiments, summarized as follows:

S1. Bob verifies Alice's identity using higher-layer protocols from the received signal, such as extensible authentication protocol and/or transport layer security.

S2. During the training stage of the PLA process, it is assumed that only Alice and Bob nodes exist. In other words, an attacker is absent. Bob estimates the channel of Alice (i.e., communication device such as the transmitting device 250 in FIG. 2*a*) using the received signal (this received signal may be an authenticated signal, e.g., an authentication response or message or the like—authenticated by an upper layer). Hence, after channel estimation, the channel may be characterized in terms of a channel signature comprising a plurality of L1 parameters. The estimated channel is then transformed to different sparse domains: Angle (1D), Angle-Delay (2D), Delay-Doppler (2D), Doppler-Angle (2D), or/and Delay-Doppler-Angle (3D) domains. It is noted that the estimated channel may be transformed to one or more sparse domains. The PLA process may be adapted in a flexible manner by accounting various sparse domains. For example, the 3D sparse domain Delay-Doppler-Angle could be considered as being a linear superposition of the 1D domain Delay and the 2D domain Doppler-Angle. However, this may not need to be the case, since the expression for the channel model $h_{k,\ell,n,m}$ is a non-linear function. Hence, different sparse domains (i.e., comprising domains with same dimension but different combination of delay, Doppler, and angle) may be used alone or combined. In environments with rather few reflections (i.e., non-multipath), it may be advantageous to transform the estimated channel to a high-dimensional sparse domain to enable a reliable and robust PLA process. In other words, the lack of paths that may be used for the PLA may be counteracted by a larger dimensionality of the sparse domain.

S3. During the training stage of the PLA process, a sparse signature (e.g., distance, azimuth angle, and elevation angle vectors) is extracted and stored in the database as explained before. The data base may be stored in memory 261 of receiving device 260 of FIG. 2*b* (i.e., Bob).

S4: In a dynamic environment scenario, a tracking process and equations are initialized at time to. The initial stage of the filter is taken from the physical layer characteristics extracted from the estimated channel at time to. This means that the parameters of the filter are initialized by determining these parameters from the channel estimated at the start of the PLA process. It is noted that estimated channel means estimating a signature of the channel, which may be used later in the verification stage.

S5. During the verification stage of the PLA process, it is assumed that Alice, Bob, and attacker nodes exist. Bob detects and extracts the signature of the channel from the received signal at time $t_i$.

S6. During the verification stage of the PLA process, Bob compares the extracted signature $d(t_i)$ at time $t_i$ with the stored signature $d_{st}(t_{i-1})$ in the database of time $t_{i-1}$ to verify the identity of the transmitter node as legitimate or not by applying a hypothesis test as:

$$\eta_0 : \eta_L = \|d(t_i) - d_{st}(t_{i-1})\| \leq \eta_{th}$$

which is a hypothesis corresponding to the case where the legitimate node Alice sent the received signal, while $$\eta_1 : \eta_L = \|d(t_i) - d_{st}(t_{i-1})\| > \eta_{th}$$

which is the hypothesis corresponding to the case where the legitimate node Alice did not send the received signal (an attacker may have sent it). $\eta_{th}$ represents a threshold where the detection and false alarm rates are met. This threshold may be predetermined. Hence, $\eta_{th}$ is a measure for the change in the channel signature. As may be discerned from the above equations, the hypothesis test is based on the distance of the feature vector d defined in the sparse domain, where said distance may be calculated from the respective distance each feature has from the reference point within the sparse domain.

The hypothesis test combines the values of $d_i$ extracted for the propagated paths in one feature vector d, with each distance $d_i$ for the i-th path being calculated using the indices x, y, and z. This means that a larger distance in component x may be compensated by a small distance in component y, for example. Hence, differences (larger and small) may be partially compensated, so that the net distance $d_i$ used in the hypothesis test is some kind of average.

Alternatively or in addition, the PLA procedure may be made more sensitive to changes by performing the hypothesis for each of the indices x, y, and z. In this case, there are multiple distances to be tested, with the distances corresponding to the index x, y, or z. The comparison is then performed with reference to three values of $\eta_{th}$, whose values may be the same or different. This option implies that there would be now three results for the hypothesis, since three distances are tested separately. Whether or not the transmitted node is legitimate may then be determined by imposing one or more additional conditions.

For example, additional conditions for the transmitter being legitimate may read:

each of x, y, and z are equal to or smaller than their respective eta value OR x and y are equal to or smaller than their respective eta value, and z is larger than its eta value etc.

In turn, the additional conditions for the transmitter not being legitimate may be formulated as the logical opposite of the above additional conditions. These additional conditions are mere examples, and hence are not meant in a limiting sense. For example, conditions may be combined by imposing priority on one or more feature components x, y, or z. One possibility is putting a larger weight on one of the components (e.g., x) than on the remaining components (e.g., y and z), when the x component has a higher priority than the components y and z. Other correspondences between priority and weight are suitable, and may depend on the application.

The above hypothesis test is performed with respect to preceding time $t_{i-1}$ and a current $t_i$. Instead of using immediate successive times, the hypothesis test may be performed by storing a predefined number of channel signatures in the data base, and compare the current channel signature with the channel signatures stored in the data base. This means that the hypothesis test is performed using a history of channel signatures, with the history length being characterized by the predefined number of stored channel signatures. In this case, changes in the channel signature may be determined with respect to time instances that are larger than the time instance specified by successive times $t_{i-1}$ and $t_i$. In this manner, instantaneous changes that may not be attributed to an attacker (e.g., instantaneous drop in QoS of the legitimate transmitter) may be smoothed, and prevents erroneous verification of the legitimate transmitter being an attacker.

S7. The process returns to the first step S1, if authenticating the transmitter node fails (i.e., the case $\eta_1$ occurs pointing out that the authentication has failed) or the system exceeds the tracking period ($t_i > T_o$), with $T_o$ being the tracking period that may be predefined. As noted before, since the PLA may be performed in a repetitive manner at time instances $t_i$ with $\Delta t = t_i - t_{i-1}$ being a repetition period, the last time instance may lie outside the tracking period $T_o$, even though the communication device (i.e. Alice) may be successfully verified by the hypothesis test. However, the tracking period sets a time constraint, so that the very last verified channel signature may not be tracked and used to update the data base with reference to the current tracking period.

S8. If the node is successfully verified and the process is still within the tracking period $T_o$ ($t_i \leq T_o$), the database signature is tracked within the tracking period, using one of the tracking filters, such as extended Kalman filter, and is then updated. This means that the tracking filter takes the current database vector (i.e., the PLA signature stored in the database) as input and processes it, and provides the next predicted database vector. The database is updated by this predicted database vector. The Kalman filter is a well-known filter generally used for tracking and predicting. Alternatively, other filters may be used, such as unscented Kalman filter, least mean squared filter or the like.

S9. The database signature is replaced with the tracked updated signature. In other words, the data base signature stored in memory 261 of receiving device 260 in FIG. 2*b* is overwritten by the tracked channel signature. This ensures that the data base holds the recent channel signature, and enables PLA in dynamic communication environments where changes in the channel signature are more likely and more pronounced than in static environments (e.g., receiving device 260 and/or transmitting device 250 are immobile).

S10. The system again observes at the next time instance $t_i \rightarrow t_{i+1}$ within the tracking period ($t_{i+1} \leq T_o$) the received signal, and the steps from S5 to S9 are repeated.

The PLA approach of the present disclosure may use a specific known tracking filter type, such as Kalman and extended Kalman filters, based on the channel conditions and variations. The initial stage of the filter is taken from the physical layer characteristics extracted from the estimated channel at time to. As long as the transmitter node is authorized within tracking duration $T_o$, Bob (i.e., receiving device 260) tracks the legitimate node's physical layer characteristics and updates its database (i.e., the physical layer characteristics is initially stored in memory 261 of receiving device 260). The process returns to the first step S1, if the authentication of the transmitted node fails or the system exceeds the tracking period.

It is noted that the PLA approach may be extended while staying within the scope of the present disclosure. For example, in static environments, the Doppler shift can be set to zero and the 3D sparse channel model is reduced to a 2D sparse model. Hence, the extracted sparse features are reduced to distance and elevation or azimuth angles vectors. Similar applies if the delay is not considered in the system scenario. The setting of the Doppler shift may be performed by the processing circuitry 262 of the receiving device (i.e., Bob), and may be comprised in the selection processing of the processing circuitry 262. In other words, a selection a plurality of L1 parameters may be implemented by setting the respective parameters to zero, for example. Thereby, a zero value of L1 parameter may indicate, in this example, not being selected.

The reference point in the sparse domain can be taken as being any temporary value ($x_{ref}$, $y_{ref}$, $z_{ref}$) or based on specific path location rather than the original point (0,0,0).

Sampling of the Doppler dimension in an insufficient manner may cause a so-called fractional Doppler effect. This effect can be exploited for further physical layer feature enhancement in the sparse Doppler domain. Fractional delays are not considered in the above scenario, since the resolution of $T_s$ is usually sufficient to capture the detailed channel information along the delay dimension over the typical wideband systems. However, in narrowband systems, the delays may be fractional values in practical systems, and these fractional values can be exploited for further enhancing the physical layer feature in the sparse delay domain. Narrowband means that the number of bins in the delay domain are small. The bins of the delay domain refer to discretized delay values that the system can capture from the continuous delay values of the channel. If the continuous delay value coming from the channel does not match with any of the discretized values, the continuous value will leakage to multiple discretized values, and cause a so-called fractional delay.

The radio frequency (RF) hardware features (such as mutual coupling in MIMO systems, and spatial wideband effect in massive wideband signaling MIMO systems) and impairments (such as CFO, I/Q imbalance, etc.) can be integrated to the system and exploited for further enhancing the sparse signature. For example, the spatial wideband effect which is also known as beam squint effect, causes a diffusion/expansion in the original beam path to be on a different location in the 3D grid (Delay-Doppler-Angle domain) over different frequencies. This means that the diffusion of the original beam path is frequency dependent. This diffusion can be exploited to enrich the sparse signature, and hence enhance the authentication performance of the system. In other words, the dimensionality of the sparse domain may be increased by using also the features RF hardware, impairment, etc.

By exploiting multi-dimensional domains, i.e., multiple grids representing a discretization of the multiple domains using bins, the capability of the authentication approach can be expanded from a single user to a multi-user authentication scheme. In other words, exploiting multiple sparse domains, a better signature of a user is possible in terms of uniqueness of the signature, which allow simultaneous receptions from different transmission points, with a low probability of having a similar/correlated signature between these legitimate transmission points. Therefore, the enhanced user uniqueness allows authentication of multiple users.

Due to the angle delay reciprocal and Doppler semi-reciprocal properties in TDD and FDD transmissions, the PLA technique can be effective in both TDD and FDD transmissions and breaks the constraint of the conventional PLA techniques being applicable to TDD transmission scenarios only. The term Doppler semi-reciprocal means that the Doppler value of uplink transmission is not equal to the Doppler value of downlink transmission. However, the uplink value can be mapped onto the downlink value, using a specific, static, and/or deterministic relation or equation, respectively, if and only if one is operating in the FDD transmission mode. However, in TDD transmission mode, both angle and Doppler are assumed to be reciprocal (the angle/Doppler value of the uplink transmissions assumed equal to the angle/Doppler values of the downlink transmissions).

The PLA technique can be applied to different networks, such as Non-Terrestrial Networks (NTN), Coordinated Multi-Point (COMP), Reconfigurable Intelligent Surfaces (RIS) based networks, massive Multiple-input, multiple-output (MIMO) system, and localization networks, sensing networks, and Joint Radar and Communications (JRC) based networks in which sensing and communication may be performed within the same network jointly or independently.

Some embodiments of the present disclosure may provide one or more or the following advantages:

A flexible approach and multi-dimensional PLA technique that can utilize various domains with different dimensionality, such as angle (1D), Delay-Doppler (2D), Angle-Doppler (2D), Angle-Delay (2D), and Angle-Delay-Doppler (3D) domains, to authenticate communication between legitimate entities.

This type of authentication may provide multiple layers of security by combining features from different domains to confirm the identity of the communicating parties.

Providing a generalized multi-dimensional framework that addresses both levels of sparsity of environments (less sparse and highly sparse), dynamic and static environments, where in time-varying environments, authentication performance can be improved using different tracking filters.

Expanding the approach to wideband systems scenarios, where the spatial-wideband effect as an inherent property of large-scale array and wideband signaling would be used to further improve the authentication performance.

A multi-attribute authentication technique can be used to improve the robustness and accuracy of the PLA, by combining channel-based attributes with hardware-based features (mutual coupling, beam squint) and imperfections (i.e., phase noise, CFO) jointly with the disclosed method, thus attaining an increased level of security in the presence of different types of attackers.

By exploiting multi-dimensional grids, the capability of the authentication approach can be expanded from a single user to a multi-user authentication scheme.

The PLA technique can be effective in both TDD and FDD transmissions.

The PLA technique can be applied to different networks such as NTN, COMP, JRC, and localization.

The present disclosure may be applicable to any wireless communication network that has sparse scattering channel conditions to provide protection against eavesdroppers, spoofing, and Sybil attacks. However, standards like 3GPP-based cellular and IEEE 802.11-based Wi-Fi networks, or any wireless network are particularly relevant to the approach of the present disclosure. Furthermore, the present disclosure can be implemented on any device, system or network capable of supporting any of the aforementioned standards, for instance: Long Term Evolution (LTE), LTE-advanced, Advance Mobile Phone Service (AMPS), 5G New Radio (NR), or other known signals that are used to communicate within a cellular wireless network with different technologies such as massive Multiple-Input-Multiple-Output (MIMO), multi-user MIMO, multi-cell MIMO, cognitive radio networks, and Internet of Things (IoT) access points.

The present disclosure provides a novel multidimensional PLA approach for the next-generation communication networks to build a fast and robust PLA framework in wireless communication systems. As such, it is applicable to the industry which is interested in high frequency communication networks, comprising millimeter-wave and terahertz, massive MIMO, single-user and multi-user MIMO, and multi-cell MIMO technologies.

In summary, the present disclosure provides for techniques and methods to perform multi-dimensional physical layer authentication in sparse domains, within dynamic and static communication environments. The present disclosure can be implemented on any device, system, or network capable of supporting any of the aforementioned standards, for instance: Long Term Evolution (LTE), LTE-advanced, AMPS, 5G New Radio (NR), or other known signals that are used to communicate within a cellular wireless network with different technologies such as massive MIMO, multi-user MIMO, multi-cell MIMO, cognitive radio networks, and IoT access points. As such, it is applicable to the industry which is interested in high frequency communication networks comprising millimeter-wave and terahertz, massive MIMO, single-user and multi-user MIMO, and multi-cell MIMO technologies.

It is noted that although embodiments and examples of the present disclosure were provided in terms of an apparatus above, the corresponding method provides the functionality described by the apparatus are also provided. Moreover, it is noted that any of the steps described above may be comprised as code instructions in a program, which may be executed by one or more processors.

The methodologies described herein may be implemented by various means depending upon the application. For example, these methodologies may be implemented in hardware, operation system, firmware, software, or any combination of two or all of them. For a hardware implementation, any processing circuitry may be used, which may comprise one or more processors. For example, the hardware may comprise one or more of application specific integrated circuits (ASICs), digital signal processors (DSPs), digital signal processing devices (DSPDs), programmable logic devices (PLDs), field programmable gate arrays (FPGAs), processors, controllers, any electronic devices, or other electronic circuitry units or elements designed to perform the functions described above.

If implemented as program code, the functions performed by the control device 300 may be stored as one or more instructions or code on a non-transitory computer readable storage medium. The computer-readable media comprises physical computer storage media, which may be any available medium that can be accessed by the computer, or, in general by the processing circuitry 320. Such computer-readable media may comprise RAM, ROM, EEPROM, optical disk storage, magnetic disk storage, semiconductor storage, or other storage devices. Some particular and non-limiting examples comprise compact disc (CD), CD-ROM, laser disc, optical disc, digital versatile disc (DVD), Blu-ray (BD) disc or the like. Combinations of different storage media are also possible—in other words, distributed and heterogeneous storage may be employed.

For example, the program code may cause the processing circuitry 261 (e.g. comprising one or more processors) to operate as a special purpose computer programmed to perform the techniques disclosed herein.

The embodiments and exemplary implementations mentioned above show some non-limiting examples. It is understood that various modifications may be made without departing from the subject matter. For example, modifications may be made to adapt the examples to new systems and scenarios without departing from the central concept described herein. In particular, the above embodiments and exemplary implementations are multiple-input multiple-output (MIMO) compatible and can be applied to all MCSs.

According to some embodiments, apparatus is provided for physical layer authentication, the apparatus comprising: a receiver configured to: receive, over a wireless channel, a signal from a communication device after a previous authentication; processing circuitry configured to: determine, based on the received signal, current value of a plurality of physical-layer, L1, parameters of the wireless channel descriptive for a sparse channel; obtain, from a storage, value of the plurality of L1 parameters stored at the previous authentication; and perform authentication of the communication device based on the current value of the plurality of L1 parameters and the value of the plurality of L1 parameters stored.

In some embodiments, the processing circuitry is further configured to update the value of the plurality of L1 parameters stored in the storage. In a further implementation, the processing circuitry is configured to select, among L1 parameters, said plurality of parameters of the wireless channel that are descriptive for a sparse channel.

For example, an L1 parameter of the wireless channel descriptive for a sparse channel is an L1 parameter of which a value range determined for said wireless channel is lower than a total value range of the L1 parameter. Moreover, the L1 parameter of the wireless channel descriptive for a sparse channel is an L1 parameter for which a ratio of the value range determined for said wireless channel and the total value range of the L1 parameter is lower than a predefined value. In addition, the plurality of L1 parameters comprise one or more of distance, azimuth angle, and elevation angle.

According to some embodiments, the performing of authentication of the communication device comprises: comparing the current value of the plurality of L1 parameters with the stored value of the plurality of L1 parameters; determining the authentication of the communication device as successful, in case a predefined condition is fulfilled; and determining the authentication of the communication device as not successful, in case the predefined condition is not fulfilled.

Moreover, in some embodiments the processing circuitry is further configured to update the stored value based on the current value when the authentication of the communication device is successful.

In some embodiments, the determining of the current value of the plurality of L1 parameters; the performing of authentication of the communication device; and the updating of the database is repeatedly executed with a predefined repetition period. For example, the stored value is updated when a difference between the current value of the plurality of L1 parameters and the stored value of the plurality of L1 parameters is equal to or smaller than a predetermined threshold.

In some embodiments, the previous authentication is an authentication performed by an upper layer. For example, the processing circuitry is further configured to perform an authentication by an upper layer when said authentication of the communication device is not successful. According to a further example, the processing circuitry is further configured to perform an authentication by an upper layer periodically with a predefined tracking period.

In some embodiments, the wireless channel is modeled as being associated with an n-th transmission antenna with integer n=0, 1, 2, . . . , $N_A$ and with an m-th reception antenna with integer m=0, 1, 2, . . . , $N_B$ as:

$$h_{m,n,l}(r) = \sum_{i=1}^{L_p} \alpha_i \, e^{-j2\pi(f_c+v_i)\tau_i} e^{j2\pi v_i r T_s} e^{j2\pi(f_c+v_i)n\frac{d}{c}\sin\theta_i} e^{-j2\pi(f_c+v_i)m\frac{d}{c}\sin\phi_i} \delta\left(\ell T_s - \tau_i - n\frac{d}{c}\sin\theta_i - m\frac{d}{c}\sin\phi_i\right)$$

where r is a time index, $L_P$ is a number of dominant propagation paths, $T_s$ is a system sampling interval, $\ell$ denotes an index along a delay domain, d is an antenna spacing, c is the speed of light, $f_c$ is a carrier frequency, $\alpha_i$ is a complex path gain, $\tau_i$ is a path delay, $v_i$ is a Doppler frequency, $\delta(\bullet)$ denotes the Dirac delta function, $\theta_i$ is an angle of departure at the i-th path, and $\phi_i$ is an angle of arrival at the i-th path; wherein the plurality of L1 parameters comprise at least one of the $\tau_i$, $L_P$, $\theta_i$, $v_i$, and $\phi_i$.

According to some embodiments, a method is provided for physical layer authentication comprising steps of: receiving, over a wireless channel, a signal from a communication device after a previous authentication; determining, based on the received signal, current value of a plurality of physical-layer, L1, parameters of the wireless channel descriptive for a sparse channel; obtaining, from a storage, value of the plurality of L1 parameters stored at the previous authentication; and performing authentication of the communication device based on the current value of the plurality of L1 parameters and the value of the plurality of L1 parameters stored.

The examples and exemplary implementations described above for the apparatus apply in the same manner to the method for physical layer authentication. The processing circuitry may be further configured to perform the steps of one or more of the above-described embodiments, examples, and exemplary implementations.

Still further, a computer program is provided, stored on a non-transitory and computer-readable medium, wherein the computer program comprises instructions which when executed on one or more processors perform the steps of the method.

The PLA approach of the present disclosure discussed above allows choosing different domains and parameters for authentication in a flexible and adaptive manner, based on different requirements, for example, device capability, security level, use cases, environment, and applications requirements. By incorporating flexibility and adaptability into the approach of the present disclosure, the authentication system is able to dynamically select suitable domains and respective domains' parameters, or combination of parameters from different domains for enhanced and robust security performance. In some embodiments, the approach of the present disclosure empowers the authentication system to dynamically select optimal domains and parameters, or combinations thereof from diverse domains. This dynamic selection enhances and fortifies the security performance. Moreover, it's worth noting that the utility of the approach of the present disclosure extends beyond wireless communication security; it also finds relevance in bolstering security for wireless sensing applications and the like. Furthermore, beyond its role in ensuring security, the concept of flexibility and adaptability inherent in the approach of the present disclosure can also be harnessed to improve other critical performance indicators in future wireless networks. These enhancements cover performance indicators of future wireless systems such as elevated data rates, expanded network capacity, heightened reliability, minimized latency, massive connectivity, wide coverage, quality of service (QOS) aware transmission, efficient power consumption, efficient localization, efficient identification, and/or efficient sensing.

According to some embodiments, the processing circuitry and/or the transceiver is embedded in an integrated circuit, IC.

Although the disclosed subject matter has been described in detail for the purpose of illustration, it is to be understood that such detail is solely for that purpose and that the disclosed subject matter is not limited to the disclosed embodiments, but, on the contrary, is intended to cover modifications and equivalent arrangements that are within the spirit and scope of the disclosure.

For example, it is to be understood that the presently disclosed subject matter contemplates that, to the extent possible, one or more features of any embodiment can be combined with one or more features of any other embodiment.

The invention claimed is:

1. An apparatus for physical layer authentication, the apparatus comprising:

a receiver configured to:

receive, over a wireless channel, a signal from a communication device after a previous authentication; and processing circuitry configured to:

determine, based on the received signal, current value of a plurality of physical-layer, L1, parameters of the wireless channel descriptive for a sparse channel;

obtain, from a storage, value of the plurality of L1 parameters stored at the previous authentication; and perform authentication of the communication device based on the current value(s) of the plurality of L1 parameters and the value(s) of the plurality of L1 parameters stored, wherein the plurality of L1 parameters define a signature vector within a sparse domain being any of a Doppler domain, a delay-Doppler domain, and a delay-Doppler-angle domain;

the signature vector having distance, azimuth angle, and elevation angle, each being determined from the plurality of L1 parameters;

the performing of the authentication is based on one or more of the distance, the azimuth angle, and the elevation angle; and wherein the wireless channel is modeled as being associated with an n-th transmission antenna with integer n=0, 1, 2, . . . , $N_A$ and with an m-th reception antenna with integer m=0, 1, 2, . . . , $N_B$ as:

$$h_{m,n,l}(r) = \sum_{i=1}^{L_p} \alpha_i \, e^{-j2\pi(f_c+v_i)\tau_i} e^{j2\pi v_i r T_s} e^{j2\pi(f_c+v_i)n\frac{d}{c}\sin\theta_i} e^{-j2\pi(f_c+v_i)m\frac{d}{c}\sin\phi_i} \delta \left(\ell T_s - \tau_i - n\frac{d}{c}\sin\theta_i - m\frac{d}{c}\sin\phi_i\right)$$

where r is a time index, $L_p$ is a number of dominant propagation paths, $T_s$ is a system sampling interval, $\ell$ denotes an index along a delay domain, d is an antenna spacing, c is the speed of light, $f_c$ is a carrier frequency, $\alpha_i$ is a complex path gain, $\tau_i$ is a path delay, $v_i$ is a Doppler frequency, $\delta(\cdot)$ denotes the Dirac delta function, $\theta_i$ is an angle of departure at the i-th path, and $\phi_i$ is an angle of arrival at the i-th path; wherein the plurality of L1 parameters comprise at least one of the $\tau_i$, $L_p$, $\theta_i$, $v_i$, and $\phi_i$.

2. The apparatus according to claim 1, wherein the processing circuitry is further configured to update the value of the plurality of L1 parameters stored in the storage.

3. The apparatus according to claim 1, wherein the processing circuitry is configured to select, among L1 parameters, said plurality of parameters of the wireless channel that are descriptive for a sparse channel.

4. The apparatus according to claim 1, wherein an L1 parameter of the wireless channel descriptive for a sparse channel is an L1 parameter of which a value range determined for said wireless channel is lower than a total value range of the L1 parameter.

5. The apparatus according to claim 4, wherein the L1 parameter of the wireless channel descriptive for a sparse channel is an L1 parameter for which a ratio of the value range determined for said wireless channel and the total value range of the L1 parameter is lower than a predefined value.

6. The apparatus according to claim 1, wherein the plurality of L1 parameters comprise one or more of distance, azimuth angle, and/or elevation angle.

7. The apparatus according to claim 1, wherein, when performing authentication of the communication device, the comprises-processing circuitry is further configured to:

compare the current value of the plurality of L1 parameters with the stored value of the plurality of L1 parameters;

determine the authentication of the communication device as successful, in case a predefined condition is fulfilled; and determine the authentication of the communication device as not successful, in case the predefined condition is not fulfilled.

8. The apparatus according to claim 1, wherein the processing circuitry is further configured to update the stored value based on the current value when the authentication of the communication device is successful.

9. The apparatus according to claim 2, wherein the processing circuitry is further configured to repeatedly:

determine the current value of the plurality of L1 parameters;

perform authentication of the communication device; and of update a database with a predefined repetition period.

10. The apparatus according to claim 8, wherein the stored value is updated when a difference between the current value of the plurality of L1 parameters and the stored value of the plurality of L1 parameters is equal to or smaller than a predetermined threshold.

11. The apparatus according to claim 1, wherein the previous authentication is an authentication performed by an upper layer.

12. The apparatus according to claim 1, wherein the processing circuitry is further configured to perform an authentication by an upper layer when said authentication of the communication device is not successful.

13. A method for physical layer authentication, comprising:

receiving, over a wireless channel, a signal from a communication device after a previous authentication;

determining, based on the received signal, current value of a plurality of physical-layer, L1, parameters of the wireless channel descriptive for a sparse channel;

obtaining, from a storage, value of the plurality of L1 parameters stored at the previous authentication; and performing authentication of the communication device based on the current value of the plurality of L1 parameters and the value of the plurality of L1 parameters stored, wherein the plurality of L1 parameters define a signature vector within a sparse domain being any of a Doppler domain, a delay-Doppler domain, and a delay-Doppler-angle domain;

the signature vector having distance, azimuth angle, and elevation angle, each being determined from the plurality of L1 parameters;

the performing of the authentication is based on one or more of the distance, the azimuth angle, and/or the elevation angle and wherein the wireless channel is modeled as being associated with an n-th transmission antenna with integer n=0, 1, 2, . . . , $N_A$ and with an m-th reception antenna with integer m=0, 1, 2, . . . , $N_B$ as:

$$h_{m,n,\ell}(r) = \sum_{i=1}^{L_p} \alpha_i e^{-j2\pi(f_c+v_i)\tau_i} e^{j2\pi v_i r T_s} e^{j2\pi(f_c+v_i)n\frac{d}{c}sin\theta_i} e^{-j2\pi(f_c+v_i)m\frac{d}{c}sin\phi_i} \delta\left(\ell T_s - \tau_i - n\frac{d}{c}\sin\theta_i - m\frac{d}{c}\sin\phi_i\right)$$

where r is a time index, $L_p$ is a number of dominant propagation paths, $T_s$ is a system sampling interval, $\ell$ denotes an index along a delay domain, d is an antenna spacing, c is the speed of light, $f_c$ is a carrier frequency, $\alpha_i$ is a complex path gain, $\tau_i$ is a path delay, $v_i$ is a Doppler frequency, $\delta(\cdot)$ denotes the Dirac delta function, $\theta_i$ is an angle of departure at the i-th path, and $\phi_i$ is an angle of arrival at the i-th path; wherein the plurality of L1 parameters comprise at least one of the $\tau_i$, $L_p$, $\theta_i$, $v_i$, and $\phi_i$.

* * * * *